(12) United States Patent
Huang et al.

(10) Patent No.: US 6,820,219 B1
(45) Date of Patent: Nov. 16, 2004

(54) INTEGRATED TESTING METHOD FOR CONCURRENT TESTING OF A NUMBER OF COMPUTER COMPONENTS THROUGH SOFTWARE SIMULATION

(75) Inventors: Hsiang-Chou Huang, Pan-Chiao (TW); Jiin Lai, Taipei (TW); Nai-Shung Chang, Taipei Hsien (TW)

(73) Assignee: VIA Technologies, Inc., Taipei Hsien (TW)

( * ) Notice: Subject to any disclaimer, the term of this patent is extended or adjusted under 35 U.S.C. 154(b) by 627 days.

(21) Appl. No.: 09/621,750

(22) Filed: Jul. 21, 2000

(30) Foreign Application Priority Data

Nov. 9, 1999 (TW) ........................................ 88119552 A

(51) Int. Cl.[7] ................................................ G06F 11/00
(52) U.S. Cl. ............................ 714/25; 714/37; 714/43; 714/48; 703/20; 703/21
(58) Field of Search ...................... 703/20, 21; 714/25, 714/37, 43, 44, 47, 48

(56) References Cited

U.S. PATENT DOCUMENTS

| | | | | |
|---|---|---|---|---|
| 4,236,246 A | * | 11/1980 | Skilling ........................ | 714/744 |
| 5,088,024 A | * | 2/1992 | Vernon et al. ................ | 710/111 |
| 5,274,774 A | * | 12/1993 | Manber et al. .............. | 710/125 |
| 5,488,573 A | * | 1/1996 | Brown et al. ................. | 703/21 |
| 5,548,785 A | * | 8/1996 | Fogg et al. .................... | 710/21 |
| 5,881,270 A | * | 3/1999 | Worthington et al. ......... | 703/21 |
| 6,002,854 A | * | 12/1999 | Lynch et al. ................... | 703/1 |
| 6,018,807 A | * | 1/2000 | Larson ......................... | 714/33 |
| 6,405,326 B1 | * | 6/2002 | Azagury et al. .............. | 714/38 |
| 6,484,281 B1 | * | 11/2002 | Wang et al. ................. | 714/733 |
| 6,507,809 B1 | * | 1/2003 | Yoshino et al. ............... | 703/21 |
| 6,535,841 B1 | * | 3/2003 | Meyer .......................... | 703/13 |
| 6,637,019 B1 | * | 10/2003 | Rinaldi ....................... | 717/104 |

* cited by examiner

Primary Examiner—Robert Beausoliel
Assistant Examiner—Michael Maskulinski
(74) Attorney, Agent, or Firm—J.C. Patents

(57) ABSTRACT

An integrated testing method is proposed to perform a test procedure on a number of computer components, concurrently, in a multitasking manner through software simulation. In this method, an initialization procedure is first performed to specify the total number of simulated operations, the FIFO buffer size, the command sequence, and the start time of operation. It is a characteristic feature of this integrated testing method that the test procedure is performed concurrently in a multitasking manner on all the components under test to operate in response to each command from the command sequence. In the event that two or more of the components under test are competing for the same resource, an arbiter is activated to perform arbitration for these competing components.

19 Claims, 2 Drawing Sheets

INTEGRATED TESTING METHOD FOR CONCURRENT TESTING OF A NUMBER OF COMPUTER COMPONENTS THROUGH SOFTWARE SIMULATION

CROSS-REFERENCE TO RELATED APPLICATION

This application claims the priority benefit of Taiwan application serial no. 88119552, filed Nov. 9, 1999.

BACKGROUND OF THE INVENTION

1. Field of the Invention

This invention relates to computer system testing technology, and more particularly, to an integrated testing method which is capable of performing a test procedure on a number of computer components, which test procedure is performed concurrently in a multitasking manner through software simulation.

2. Description of Related Art

A computer system is typically included with various kinds of components, such as IDE (Integrated Device Electronics) compliant components, USB (Universal Serial Bus) compliant components, PCI/ISA (Peripheral Component Interconnect, Industry Standard Architecture) compliant components, to name just a few. Before shipment, these components have to undergo a test procedure to check the operability thereof. Conventionally, each component is tested by a specifically designed test procedure. In other words, an IDE-compliant component is tested through a test procedure specifically designed to test the IDE-compliant component, while an USB-compliant component is tested through another test procedure specifically designed to test the USB-compliant component.

By a software-simulated test procedure, for example on an IDE-compliant component, a test pattern is generated by a PCI master unit or slave unit, and which is then transferred via a PCI/ISA control unit to the IDE-compliant component to test its responses to the test pattern. This test procedure, however, is inapplicable to testing a USB-compliant component, and the USB-compliant component should be tested by another test procedure specifically designed therefor.

In practice, however, the various components are mounted together on a motherboard and operated in an interrelated manner to share or compete for the resources on the motherboard. Separate test procedures for these components are less likely to discover those problems that will arise from the conflicts between these components. If these conflicts are unresolved in the testing, they might cause the computer system to crash during real operations.

One solution to the foregoing problem is a hardware-based test procedure, in which all the various components, after tape-out, are mounted on a single test board to undergo a test procedure that simulates the real operations of these components. This hardware-based test procedure allows the test engineers to discover and resolve possible conflicts between these components.

One drawback to the forgoing hardware-based test procedure, however, is that it is quite costly to implement. This is because the hardware-based test procedure requires repeated adjustments in parameter settings and repeated replacements of hardware devices, which makes the procedure quite laborious and time-consuming to carry out.

Still another drawback to the hardware-based test procedure is that it can be carried out only after the tape-out of the components. If a component is judged to be defective, it will be discarded and then redesigned. This practice, however, makes the overall manufacture quite cost-ineffective. The hardware-based test procedure is therefore highly undesirable.

In summary, the prior art has the following drawbacks.

First, the testing of each of the various components through a specifically designed test procedure is less likely to discover those problems that will arise from the conflicts between these components when they operate together. If these conflicts are not resolved by the testing, they might cause the computer system to crash during real operations. Second, the hardware-based test procedure is quite laborious and time-consuming to carry out, and is therefore quite costly to implement.

SUMMARY OF THE INVENTION

It is therefore the primary objective of this invention to provide an integrated testing method, which is capable of concurrently performing a test procedure on a number of components, which test procedure is performed in a multitasking manner through software simulation.

It is another objective of this invention to provide an integrated testing method which can be performed before the tape-out of the components so that the overall manufacture process can be made more cost-effective than the prior art.

In accordance with the foregoing and other objectives, the invention proposes an integrated testing method for performing a test procedure on a number of components concurrently in a multitasking manner through software simulation.

The integrated testing method of the invention includes the following steps: specifying a total number of simulated operations for the testing of the components under test; specifying a FIFO buffer size for the components under test; generating a command sequence including a number of commands based on a first specified random number range, with each command being used to simulate a certain task; generating a start time of operation based on a second specified random number range; concurrently activating all the components under test to operate in response to each command from the command sequence; and in the event that at least two of the components under test are competing for the same resource, activating an arbiter to perform arbitration for these competing components.

The components under test include, for example, a DMA (Direct Memory Access) component, an SIO (Super Input/Output) component, an ISA (Industry Standard Architecture) component, an AC (Audio Codec) component, a USB (Universal Serial Bus) component, an IDE (Integrated Device Electronics) component, an AGP (Accelerated Graphic Port) component, a PCI (Peripheral Component Interconnect) component, and a CPU (Central Processing Unit). The arbiter can be either a South Bridge chipset or a North Bridge chipset.

The integrated testing method of the invention allows the test procedure to be performed concurrently in a multitasking manner on all the components through software simulation, which is more efficient than the prior art. Moreover, the invention allows the test procedure to be less laborious and time-consuming, and is therefore more cost-effective to implement than the prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

First Preferred Embodiment

Figure 1:
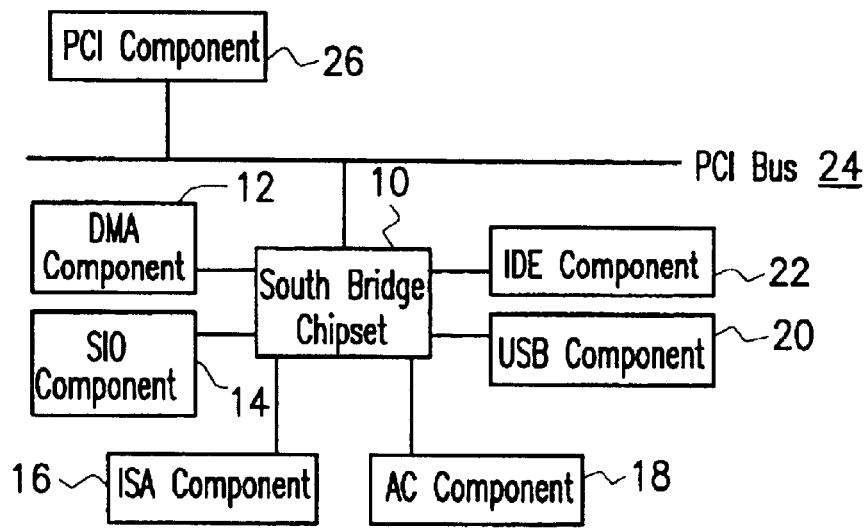
FIG. 1 is a schematic diagram of a first preferred embodiment of the integrated testing method of the invention based on a South Bridge chipset.

FIG. 1 is a schematic diagram of a first preferred embodiment of the integrated testing method of the invention. As shown, this integrated testing method is based on a South Bridge chipset 10 for the testing of a number of computer components including a DMA (Direct Access Memory) component 12, an SIO (Super Input/Output) component 14, an ISA (Industry Standard Architecture) component 16, an AC (Audio Codec) component 18, a USB (Universal Serial Bus) component 20, an IDE (Integrated Device Electronics) component 22, and a PCI (Peripheral Component Interconnect) component 26. A PCI bus 24 is interconnected between the South Bridge chipset 10 and the PCI component 26. Beside the PCI component 26, all the other components, i.e., the DMA component 12, the S10 component 14, the ISA component 16, the AC component 18, the USB component 20, and the IDE component 22, can also request use of the PCI bus 24 for data transfer.

Figure 3:
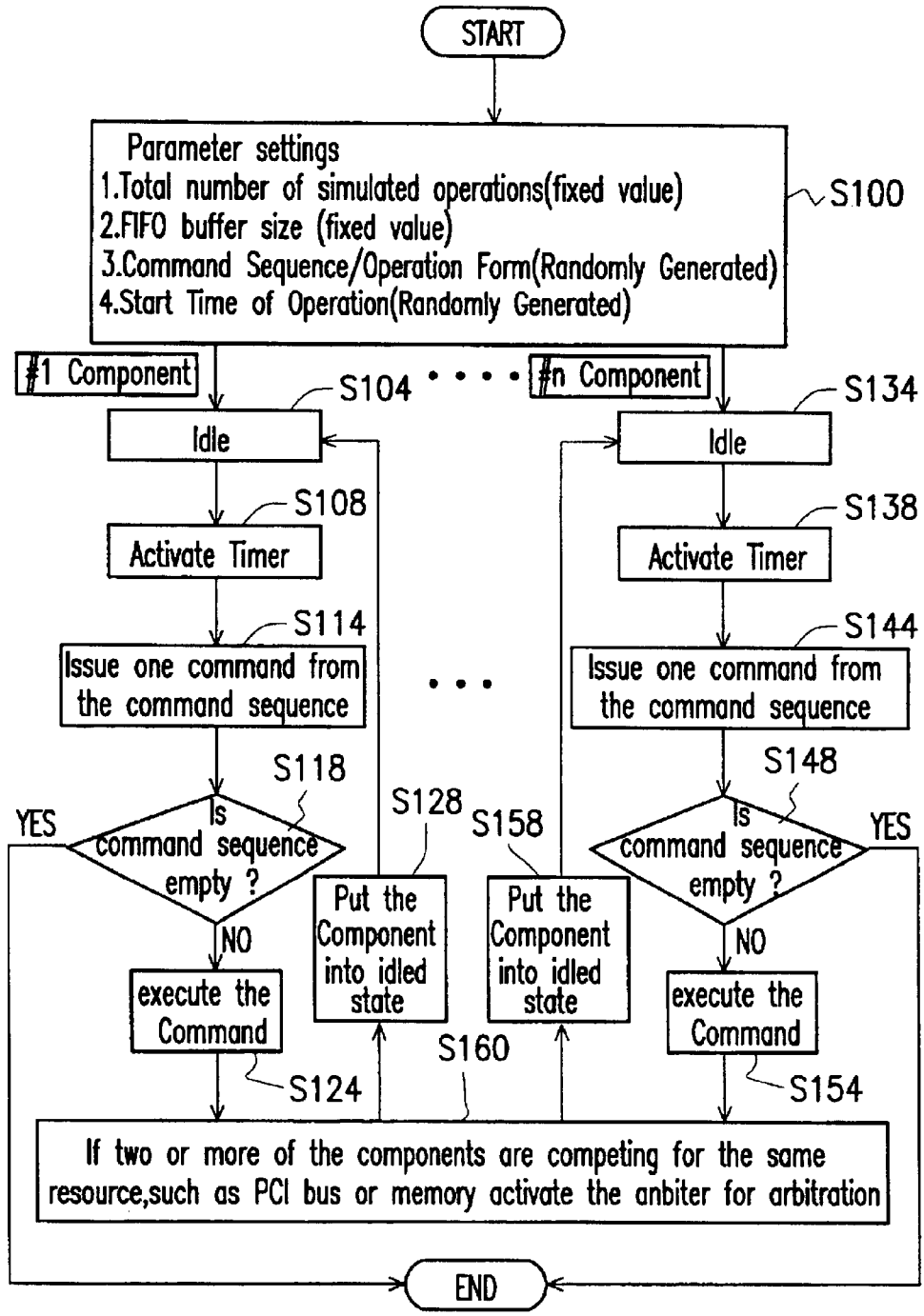
FIG. 3 is a flow chart showing the procedural steps performed by the integrated testing method of the invention to perform a test procedure on a number of components.

FIG. 3 is a flow chart showing the procedural steps performed by the integrated testing method of the invention for performing a test procedure on a number of computer components concurrently in a multitasking manner through software simulation. In FIG. 3, the components under test are labeled with #1, #2, . . . , #n, where n is the total number of the components under test. In the case of FIG. 1, these components #1, #2, . . . ,#n are the DMA component 12, the SIO component 14, the ISA component 16, the AC component 18, the USB component 20, the IDE component 22, and the PCI component 26. The South Bridge chipset 10 serves as an arbiter for the DMA component 12, the SIO component 14, the ISA component 16, the AC component 18, the USB component 20, and the IDE component 22 when these components want to use the PCI bus 24.

Referring to FIG. 3, in the first step S1000, an initialization procedure is performed to specify four sets of parameters: (1) total number of simulated operations (which is a fixed value); (2) FIFO buffer size (which is a fixed value); (3) command sequence (which includes a randomly-generated sequence of commands that will be used to test the responses of the components under test); and (4) start time of operation (which is also randomly generated). The total number of simulated operations and the FIFO buffer size are fixed values which will be fixed throughout the testing. The command sequence and the start time of operation are randomly generated from a preset range of random numbers.

It is a characteristic feature of the invention that the testing is performed concurrently on all the components under test in a multitasking manner. Since these components #1, #2, . . . , #n are tested through the same test procedure, the following description of the test procedure is directed only to the #1 component. In step S104, the #1 component is set in an idle state. In the next step S108, a timer (not shown) is activated to count time, which activates the #1 component at the start time of operation for the #1 component which is randomly generated in step S100.

In the next step S114, the #1 component issues one command from the randomly generated command sequence. In the next step S118, it is checked whether the command sequence is empty is determined. If YES, the procedure is ended;, if NO, the procedure goes to step S124.

In step S124, the #1 component is activated to function in response to the command issued in the foregoing step S114. In the case of FIG. 1, for example, the command may request that the #1 component use the PCI bus 24 for data transfer. After this, the procedure goes to step S1160.

In step S160, whether any one of the other components is also competing for the access to the same resource is determined. In the case of FIG. 1, for example, some or all of the DMA component 12, the SIO component 14, the ISA component 16, the AC component 18, the USB component 20, and the IDE component 22 may request use of the PCI bus 24, at the same time. However, since the PCI bus 24 can be used by only one component at a time, the South Bridge chipset 10 is used to perform the arbitration between the requests from these components.

It is a characteristic feature of the invention that it allows all the components under test to undergo the test procedure concurrently in a multitasking manner. Due to this concurrent multitasking operation, the condition of these components competing for the same resource can be simulated during the test procedure, which is incapable of being achieved by the prior art.

After step S160 is completed, the procedure goes to step S128, in which the #1 component is put into an idle state. The test procedure is then repeated again from step S104 until all the commands in the command sequence have been issued.

It is to be noted that the completion of the testing for the #1 component is not the completion of the overall test procedure on all the components under test. The overall test procedure is completed until all the components under test have been tested. It is also to be noted that the number of the components under test is unlimited, i.e., n can be equal to or greater than 2.

Each of the components under test undergoes the same test procedure comprising steps S104, S108, S114, S124, S160, and S128 as described above. Different components may need different periods of time to complete the test procedure and have different command sequence lengths and command forms.

Second Preferred Embodiment

Figure 2:
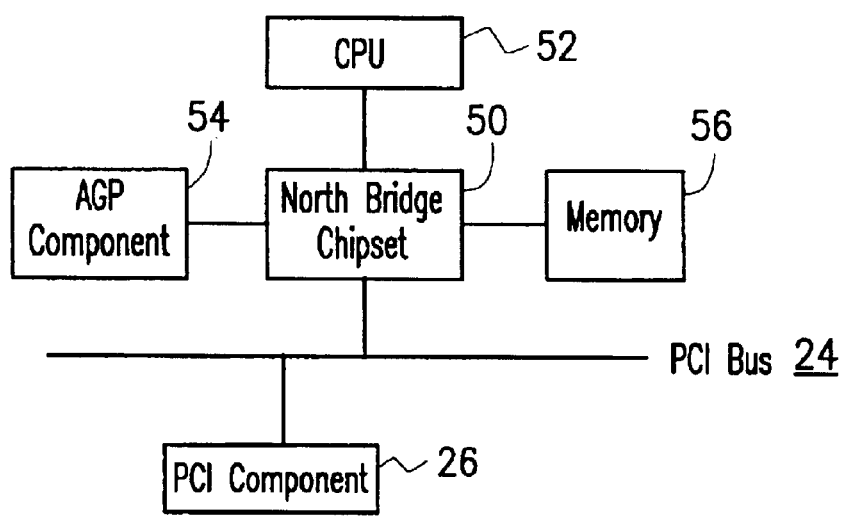
FIG. 2 is a schematic diagram of a second preferred embodiment of the integrated testing method of the invention based on a North Bridge chipset.

FIG. 2 is a schematic diagram of a second preferred embodiment of the integrated testing method of the invention, which is based on a North Bridge chipset 50 for the testing of a number of computer components including a CPU (Central Processing Unit) 52 and an AGP (Accelerated Graphic Port) component 54. Moreover, a memory unit 56 is connected to the North Bridge chipset 50, and a PCI bus 24 is interconnected between the North Bridge chipset 50 and the PCI component 26. During operation, the CPU 52 and the AGP component 54 may compete for access to the memory unit 56 or the PCI bus 24.

In the case of FIG. 2, for example, the components under test are the CPU 52, the AGP component 54, and the PCI component 26 (i.e., the components #1, #2, . . . , #n depicted in FIG. 3). During testing, these components each undergo the same test procedure depicted in FIG. 3, so description thereof will not be further detailed.

During operation, the CPU 52 and the AGP component 54 may compete for the access to the PCI bus 24 or the memory unit 56. In this embodiment, the arbitration for this condition is performed by the North Bridge chipset 50.

CONCLUSION

In conclusion, the integrated testing method of the invention has the following advantages over the prior art. First, the invention allows the test procedure to be performed concurrently in a multitasking manner on all the components through software Simulation, which is more efficient than the prior art. Moreover, the invention allows the lest procedure to be less laborious and time-consuming, and is therefore more cost-effective to implement than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An integrated testing method capable of performing a test procedure coucurrently in a multitasking manner on a number of computer components through sorfware simulation, the integrated testing method comprising the steps of:

specifying a total number of simulated operations for testing the components;

specifying a FIFO buffer size for the components;

generating a command sequence including a number of commands based on a first specified random number range, with each command being used to simulate a certain task;

generating a start time of operation based on a second specified random number range;

concurrently activating all the components under test are competing for access to a certain resource, activating an arbiter to perform arbitration for these competing components.

2. The integrated testing method of claim 1, wherein the resource is a PCI bus.

3. The integrated testing method of claim 1, wherein the resource is a memory unit.

4. The integrated testing method of claim 1, wherein the components under test include a DMA component, a SIO component, an ISA component, an AC component, an USB component, an IDE component, an AGP component, a PCI component, and a CPU.

5. The integrated testing method of claim 1, wherein the arbiter is a South Bridge chipset.

6. The integrated testing method of claim 1, wherein the arbiter is a North Bridge chipset.

7. A testing method in a multitasking manner for testing a number of components through software simulation, the testing method comprises:

concurrently activating said components by at least one command to simulate a certain task, when two or more components are competing for access to a resource, activating an arbiter to perform arbitration for these competing components, wherein the components are selected from the group consisting of a DMA component, a SIO component, an ISA component, an AC component, an USB component, an IDE component, an AGP component, a PCI component, and a CPU.

8. The testing method of claim 7, wherein said at least one command is generated from a command sequence, with each command in said sequence being used to simulate a certain task.

9. The testing method of claim 7, wherein said arbiter is activated to perform arbitration between said competing components and to put said competing components into idle state.

10. The testing method of claim 7, wherein the resource is a PCI bus.

11. The testing method of claim 7, wherein the resource is a memory unit.

12. The testing method of claim 7, wherein the arbiter is a South Bridge chipset.

13. The testing method of claim 7, wherein the arbiter is a North Bridge chipset.

14. A testing method in a multitasking manner for testing a number of components through software simulation, the testing method comprises:

concurrently activating said components by at least one command in a random command sequence on a random start time of operation to simulate a certain task, when two or more components are competing for access to a resource, activating an arbiter to perform arbitration for these competing components.

15. The testing method of claim 14, wherein said at least one command is generated from said random command sequence, with each command in said sequence being used to simulate a certain task.

16. The testing method of claim 14, wherein said arbiter is activated to perform arbitration between said competing components and to put said competing components into idle state.

17. The testing method of claim 4, wherein the resource is a PCI bus or a memory unit.

18. The testing method of claim 14, wherein the components include a DMA component, an ISA component, an AC component, an USB component, an IDE component, an AGP component, a PCI component, and a CPU.

19. The testing method of claim 14, wherein the arbiter is a South Bridge chipset or a North Bridge chipset.

* * * * *